(12) United States Patent  
Flanagan

(10) Patent No.: US 7,183,771 B2  
(45) Date of Patent: Feb. 27, 2007

(54) MULTIPLE TRANSMITTER AND RECEIVER WELL LOGGING DEVICE WITH ERROR CALIBRATION SYSTEM INCLUDING CALIBRATION INJECTION SYSTEM

(75) Inventor: William D. Flanagan, Houston, TX (US)

(73) Assignee: Ultima Labs, Inc., Houston, TX (US)

( * ) Notice: Subject to any disclaimer, the term of this patent is extended or adjusted under 35 U.S.C. 154(b) by 40 days.

(21) Appl. No.: 10/980,690

(22) Filed: Nov. 3, 2004

(65) Prior Publication Data

US 2005/0088180 A1   Apr. 28, 2005

Related U.S. Application Data

(63) Continuation-in-part of application No. 10/237,439, filed on Sep. 9, 2002, now Pat. No. 6,822,455.

(51) Int. Cl.  
*G01V 3/12* (2006.01)

(52) U.S. Cl. ..................................... 324/338

(58) Field of Classification Search ........ 324/338–343; 702/7, 11  
See application file for complete search history.

(56) References Cited

U.S. PATENT DOCUMENTS

| | | | |
|---|---|---|---|
| 4,451,789 A | 5/1984 | Meador | |
| 4,609,873 A | 9/1986 | Cox et al. | |
| 4,613,821 A * | 9/1986 | Sternberg et al. | 324/323 |
| 4,949,045 A | 8/1990 | Clark et al. | |
| 4,968,940 A | 11/1990 | Clark et al. | |
| 5,260,660 A * | 11/1993 | Stolarczyk | 324/338 |
| 5,594,343 A | 1/1997 | Clark et al. | |
| 6,184,685 B1 | 2/2001 | Paulk et al. | |
| 6,304,086 B1 | 10/2001 | Minerbo et al. | |
| 6,353,321 B1 | 3/2002 | Bittar | |
| 6,476,609 B1 | 11/2002 | Bittar | |
| 6,538,447 B2 | 3/2003 | Bittar | |
| 6,541,979 B2 | 4/2003 | Omeragic | |
| 6,603,312 B2 * | 8/2003 | Sinclair | 324/339 |
| 2006/0017442 A1 * | 1/2006 | Folberth | 324/334 |

* cited by examiner

*Primary Examiner*—Jay M. Patidar  
(74) *Attorney, Agent, or Firm*—C. Dean Domingue; Robert L. Waddell; Ted M. Anthony

(57) ABSTRACT

A device and method for obtaining an electromagnetic propagation measurement of a subterranean geologic formation, with the formation being intersected by a borehole. The device comprises a transmitter for transmitting an electromagnetic signal, and a first and second receiver for receiving the transmitted signal. The device further comprises a circuit for injecting a calibration signal into the first receiver and the second receiver, and a processor for processing the uncalibrated receiver signal and the calibration signal to obtain electromagnetic propagation measurement that is free from errors introduced by the receiving elements of the system. The processor may include a receiver data acquisition circuit for correcting data acquisition errors related to the first receiver and the second receiver.

35 Claims, 12 Drawing Sheets

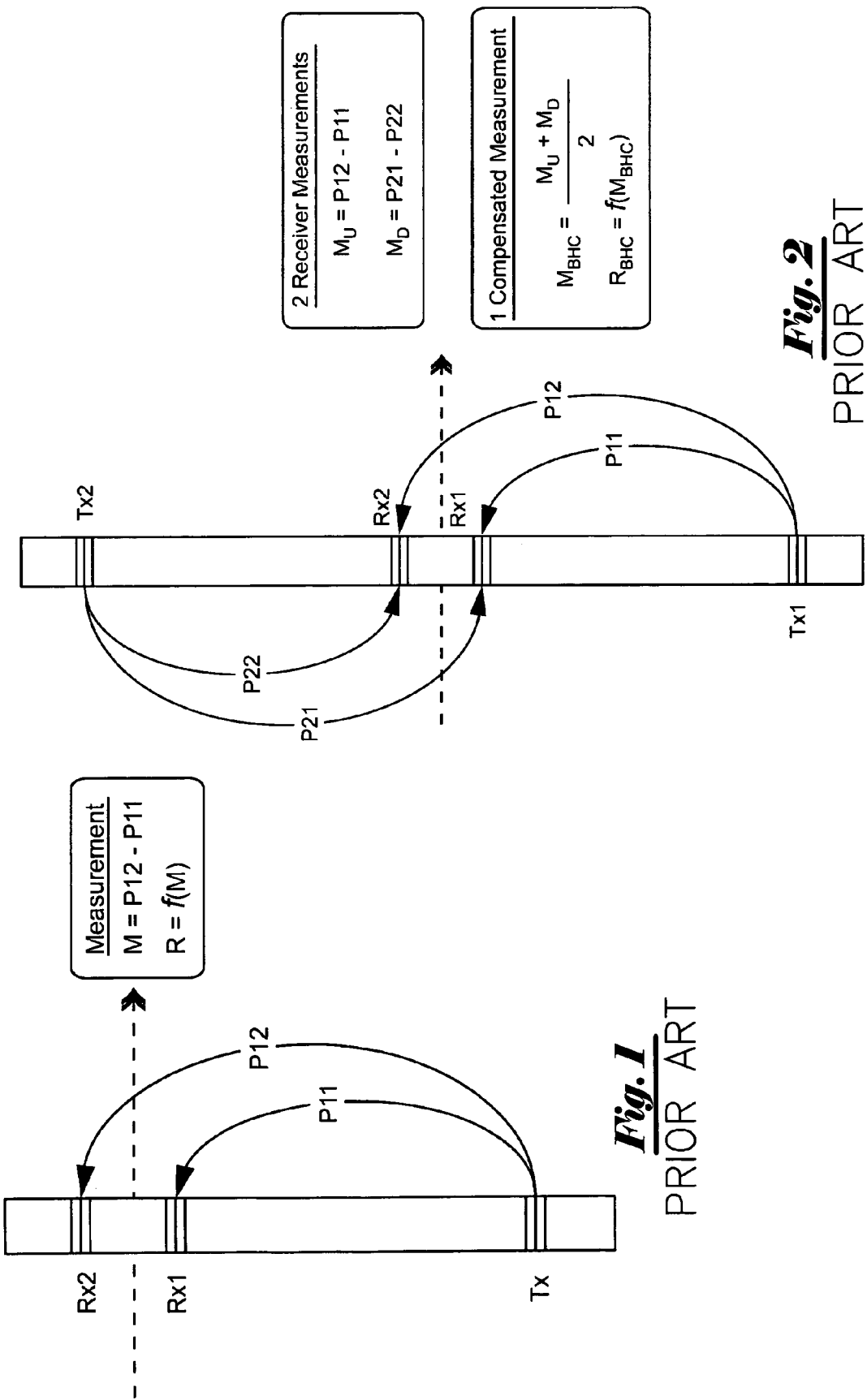

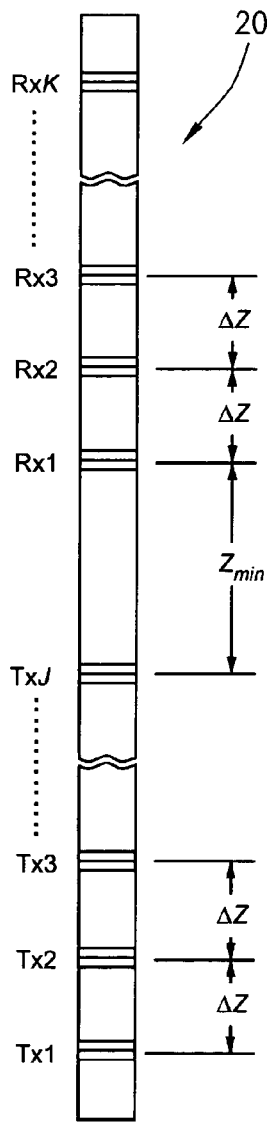

Total Number of Transmitters = $J$

Total Number of Receivers = $K$

Total Number of TxRx Pairs $N_{TR} = J \times K$

Number of Unique TxRx Spacings $NS_{TR} = J + K - 1$

Number of Unique TxRxRx Spacings $NS_{TRR} = J + K - 2$

Number of Unique RxTxTx Spacings $NS_{RTT} = NS_{TRR}$

Unique Spacings for TxRx Pairs $$ZTR_n = Z_{min} + (n \times \Delta Z) ; \quad n = 0,1...(NS_{TR}-1)$$

Unique Spacings for Tx to RxRx pair midpoints $$ZTRR_n = Z_{min} + \frac{\Delta Z}{2} + (n \times \Delta Z) ; \quad n = 0,1...(NS_{TRR}-1)$$

Fig. 8

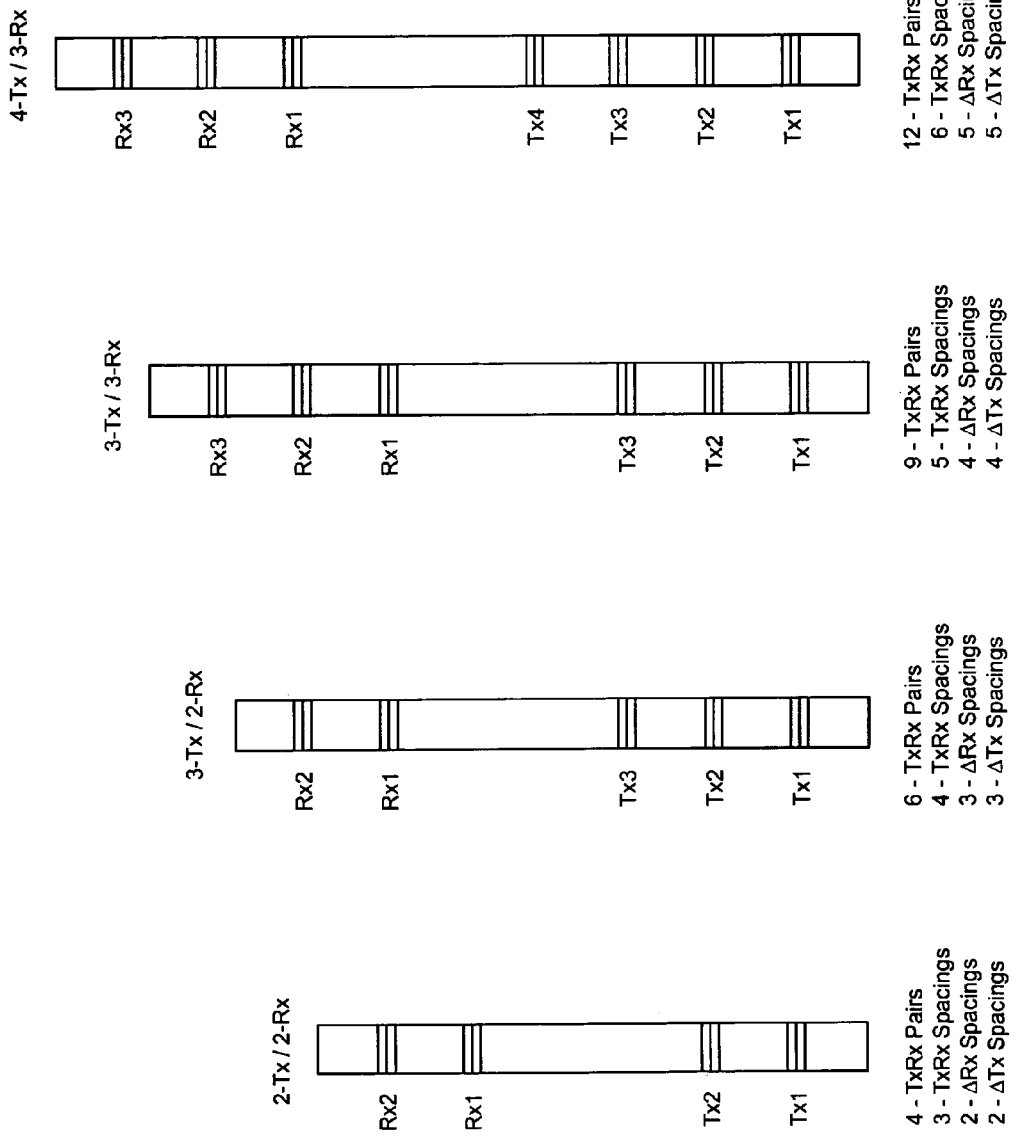

MULTIPLE TRANSMITTER AND RECEIVER WELL LOGGING DEVICE WITH ERROR CALIBRATION SYSTEM INCLUDING CALIBRATION INJECTION SYSTEM

This application is a continuation-in-part application of my presently application Ser. No. 10/237,439, filed on 9 Sep. 2002 now U.S. Pat. No. 6,822,455.

BACKGROUND OF THE INVENTION

This invention relates to the field of well logging. More specifically, the invention relates to a novel apparatus and techniques for eliminating data acquisition errors inherent in electromagnetic propagation wave devices. The invention also relates to an apparatus and method for measuring the resistivity of geologic formations surrounding a borehole during well logging and logging while drilling operations.

Formation resistivity is commonly used to evaluate geologic formations surrounding a borehole. Formation resistivity indicates the presence of hydrocarbons in the geologic formations. Porous formations having high resistivity generally indicate that they are predominantly saturated with hydrocarbons, while porous formations with low resistivity indicate that such formations are predominantly saturated with water.

Devices have been previously developed for measuring formation resistivity. Many of these devices measure formation resistivity by measuring the properties of propagating electromagnetic waves. For example, FIG. 1 shows an early generation, uncompensated propagation wave resistivity tool comprising one transmitter and two receivers for measuring the properties of an electromagnetic wave over two propagation paths. Property P11 represents an electromagnetic propagation property for the propagation path from transmitter (Tx) to a first receiver (Rx1), and P12 represents the same electromagnetic propagation property as used for P11 but for the propagation path from the transmitter to a second receiver (Rx2). Typically, the propagation properties measured are attenuation and phase. A differential measurement (M) is formed by taking the difference between P12 and P11. This difference allows any errors related to the transmitter elements of the system to be removed from the final measurement (M). The measurement (M) is then converted to formation resistivity (R) via function (f) which provides the relationship between the differential propagation property (M) and the resistivity of the surrounding formation.

FIG. 2 illustrates another propagation wave resistivity tool described in U.S. Pat. No. 4,949,045 to Clark et al. (1990) and in U.S. Pat. No. 4,968,940 to Clark et al. (1990). This tool provided improved measurement accuracy and reduced sensitivity to the effects of borehole irregularities when compared to the "uncompensated" tool shown in FIG. 1. Such tool comprised two transmitters and a receiver pair located between the two transmitters and is known as a borehole compensated tool. $M_U$ represents the differential measurement for the upward propagating electromagnetic wave from transmitter (Tx1) and $M_D$ represents the differential measurement for the downward propagating electromagnetic wave from transmitter (Tx2). A borehole compensated measurement $M_{BHC}$ can be calculated by averaging the upward propagating measurement, $M_U$, and the downward propagating measurement, $M_D$. The formation resistivity is determined in a fashion similar to the uncompensated tool by converting propagation property ($M_{BHC}$) to resistivity with function (f). By averaging the measurements from the upward and downward propagating electromagnetic waves, the effects of borehole rugosity on the measured formation resistivity can be reduced. This average also removes errors corresponding to the two receiver elements of the system, Rx1 and Rx2. Like the uncompensated device, the borehole compensated device also eliminates the errors related to the transmitting elements of the system by using differential receiver measurements, $M_U$ and $M_D$.

Although borehole compensated tools provide a more accurate measurement of formation resistivity than conventional uncompensated tools, such technique requires a tool approximately twice as long as an uncompensated tool. Tool length for an uncompensated tool with a single radial depth of investigation is directly related to the spacings between the transmitter and receiver pair. Longer spacings between the transmitter and receiver pair provide greater depth of investigation than shorter spacing and require a longer tool body accordingly. The tool length for a borehole compensated tool as described in patents '045 and '940 with an equivalent radial depth of investigation as an uncompensated tool will be approximately twice as long because of the requirement of both upper and lower transmitter elements.

Another compensated tool was described in U.S. Pat. No. 5,594,343 to Clark et al. (1997) wherein the transmitters were asymmetrically located on both sides of a receiver pair. Similar to the '045 and '940 patents previously described, such tool also required placement of at least one transmitter on each side of the receiver pair and also required a long tool body.

The compensated tools described above require a long tool body in the borehole to correctly position the transmitters and receivers. Long well tools not only require additional material and cost more to manufacture but they are more likely to bind or stick in narrow or deviated boreholes. This problem is particularly acute in multilateral wellbores having a reduced entry radius and in highly deviated wellbores. Accordingly, a need exists for an improved system with reduced cost that is also capable of facilitating tool movement within a wellbore while gathering useful information regarding geologic formation characteristics such as resistivity and other geologic formation indicators.

SUMMARY OF THE INVENTION

The invention provides a system for evaluating a geologic formation property proximate to a borehole through such formation. The system comprises a tool body moveable through the borehole, a first transmitter engaged with the tool body for generating a signal into the geologic formation, a second transmitter engaged with the tool body proximate to the first transmitter for generating a signal into the geologic formation, a first receiver engaged with the tool body for receiving signals generated by the first and second transmitters, and a second receiver engaged with the tool body proximate to the first receiver for receiving signals generated by the first and second transmitters.

Another embodiment of the invention provides an apparatus comprising a tool body moveable through the borehole, a first transmitter engaged with the tool body for generating an electromagnetic wave into the geologic formation, a second transmitter engaged with the tool body proximate to the first transmitter for generating an electromagnetic wave into the geologic formation, a first receiver engaged with the tool body for receiving electromagnetic wave energy generated by the first and second transmitters and for generating electrical signals representing the electromagnetic wave energy, a second receiver engaged with the tool body proximate to the first receiver for receiving electromagnetic wave energy generated by the first and second transmitters and for generating electrical signals representing the electromagnetic wave energy, and a controller for processing the electrical signals generated by the first and second receivers.

The method of the invention comprises the steps of deploying a tool body in the borehole, of generating electromagnetic wave energy from the first transmitter at a selected location in the borehole, of generating electromagnetic wave energy from the second transmitter at a selected location in the borehole, of operating the first and second receivers in response to the electromagnetic wave energy generated by the first and second transmitters to generate electrical signals representing the electromagnetic wave energy, and of transmitting said electrical signals to the controller.

In a second preferred embodiment herein disclosed, a method and device for evaluating a geologic formation property proximate to a borehole intersecting such formation is disclosed. The method comprises providing a device within the borehole, with the device comprising a first transmitter, located on the device, for transmitting a signal into the geologic formation; a first and second receiver located on the device, for receiving the transmitted signal; and, a processor means for processing the receiver signals.

The method includes generating a signal from the transmitter into the geologic formation and receiving the transmitted signal at the first and second receivers. The method further includes injecting a calibration signal with a calibration circuit into the first receiver and the second receiver and processing the received signal from the geologic formation and the calibration signal within the processor means. The method includes correcting errors related to the first and second receiver elements of the system and determining the resistivity measurement.

In one preferred embodiment, the step of processing the uncalibrated receiver signal and the calibration signal comprises measuring the phase difference of the uncalibrated signal provided by the first receiver and the second receiver. Also, in one preferred embodiment, the step of processing the uncalibrated receiver signals and the calibration signal includes calculating a phase difference free of data acquiring errors by computing the phase difference as follows:

$$PD = (\theta_{M1} - \theta_{M2}) - (\theta_{MC1} - \theta_{MC2}),$$

Wherein PD is the phase difference free of acquisition errors;

$\theta_{M1}$ is the measured phase of the uncalibrated signal from the first receiver;

$\theta_{M2}$ is the measured phase of the uncalibrated signal from the second receiver;

$\theta_{MC1}$ is the measured phase of the calibration signal from the first receiver;

$\theta_{MC2}$ is the measured phase of the calibration signal from the second receiver;

The calibration signal, in one embodiment, is at a first frequency and the receiver signal is at the first frequency and the method further comprises time multiplexing the uncalibrated receiver signal with the calibration signal. The step of time multiplexing may be accomplished by sequentially activating the transmitter and then the calibration circuits.

Additionally, a second embodiment comprises a frequency domain multiplexing scheme and the method may further comprise separating the calibration signal from the received signal by providing a difference in frequency with a frequency domain multiplexing circuit operatively associated with the processor means.

In one preferred embodiment, the frequency difference is selected as follows:

$$\Delta F = N/t_a,$$

Wherein $\Delta F$ is the frequency difference between the receiver and calibration signals;

N is an integer;

$t_a$ is the acquisition time interval.

According to the teachings of the present invention, the calibration signals may be injected into the front end of the receiver elements thereby adding the calibration signal in series with the receiving elements.

In one preferred embodiment, the calibration signal is injected into the receiver front ends using a current loop, and wherein the current loop has a current transformer placed therein and the method further includes sampling the current in the loop with a current sampling resistor.

Also, the device may be provided with a third receiver and the method further comprises injecting the calibration signal into the third receiver. The method may further comprise computing a differential calibration quantity for the first receiver and the second receiver, computing the differential calibration quantity for the second receiver and the third receiver, and, computing the differential calibration quantity for the first receiver and the third receiver.

A device for obtaining a resistivity measurement of a subterranean geologic formation is also disclosed. The subterranean geologic formation is intersected by a borehole. The device includes a transmitter for transmitting a signal into the geologic formation, a first and second receiver for receiving the transmitted signal, and means for injecting a calibration signal into the first receiver and the second receiver. The device may further comprise means for processing the uncalibrated receiver signal and the calibration signal to obtain the resistivity measurement.

The processor means may include a receiver data acquisition circuit for correcting data acquisition errors related to the first and second receivers.

In one embodiment, the signal injecting means includes applying the calibrated signal in series with the first receiver and the second receiver. The device may be provided with a third receiver and the device further comprises means for injecting the calibration signal into the third receiver. The device may further comprise means for computing a differential calibration quantity for the first receiver and the second receiver; means for computing a differential calibration quantity for the second receiver and the third receiver; and, means for computing a differential calibration quantity for the first receiver and the third receiver.

In one preferred embodiment, the processing means further comprises means for measuring a phase difference between the first receiver and the second receiver free of errors. The phase difference measuring means computes the phase difference as follows:

$$PD = (\theta_{M1} - \theta_{M2}) - (\theta_{MC1} - \theta_{MC2}),$$

Wherein PD is the phase difference free from errors;

$\theta_{M1}$ is the measured phase of the uncalibrated signal from the first receiver;

$\theta_{M2}$ is the measured phase of the uncalibrated signal from the second receiver.

$\theta_{MC1}$ is the measured phase of the calibration signal from the first receiver element;

$\theta_{MC2}$ is the measured phase of the calibration signal from the second receiver element;

In one embodiment, the calibration signal is at a first frequency and the receiver signal is at the first frequency and the device further comprises means, operatively associated with the processing means, for time multiplexing the uncalibrated receiver signal with the calibration signal. The time multiplexing means includes means for sequentially activating the transmitter and a calibration signal injecting circuit operatively associated with the processing means.

The device may further comprise a frequency domain multiplexing means for separating the calibration signal from the received formation signal by a difference in frequency. The frequency difference of the separating means is selected as follows:

$$\Delta F = N/t_a,$$

Wherein $\Delta F$ is the frequency difference;
N is an integer;
$t_a$ is the acquisition time interval.

In one preferred embodiment, the frequency domain multiplexing means cancels out the received formation signal while processing the calibration signal, and cancels out the calibration signal while processing the received formation signal.

Additionally, the calibration signals may be injected into the first receiver and the second receiver front ends using a current loop. The current loop may contain a current transformer placed therein and the device further includes means for sampling the current in the loop with a current sampling resistor.

An advantage of the present invention includes that the device and method provides a means to correct, in real time, data acquisition errors of propagation wave devices that use multiple receivers to measure propagation parameters such as attenuation and phase difference.

Another advantage of the present invention is that the disclosed calibration method is less complex as compared to other methods that use depth alignment of similar propagation measurements to determine errors introduced by the receiver data acquisition electronics.

Yet another advantage is a simpler calibration method that requires no borehole depth information. Another advantage is the elimination of errors related to the time drift of electronic parameters. Still yet, another advantage is the downhole computation in real time of calibrated dual-receiver propagation measurements.

BRIEF DESCRIPTION OF THE DRAWINGS

FIG. 1 illustrates a conventional uncompensated propagation wave resistivity tool.

FIG. 2 illustrates a form of a conventional compensated propagation wave resistivity tool.

FIG. 8 illustrates the layout of a depth offset compensated tool.

FIGS. 9 through 12 illustrate different transmitter and receiver configurations for a depth offset compensated propagation wave resistivity tool.

DESCRIPTION OF THE PREFERRED EMBODIMENTS

Figure 3:
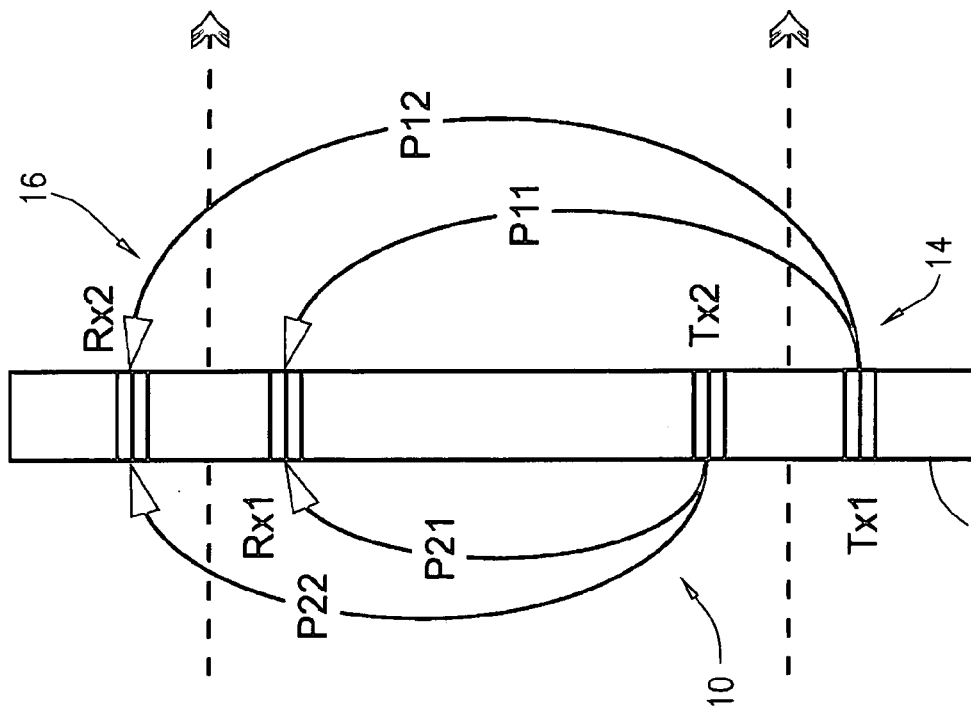
FIG. 3 illustrates a schematic view of a propagation wave resistivity system.

The invention provides a unique propagation wave resistivity system. The system is capable of providing two depths of investigation as shown in FIG. 3. Tool 10 comprises tool body 12 carrying two transmitters identified as transmitter pair 14 and two receivers identified as receiver pair 16. First transmitter Tx1 is located proximate to second transmitter Tx2. Located at a selected distance from transmitter pair 14 are first receiver Rx1 and second receiver Rx2.

Property P11 illustrates the electromagnetic property of the propagation path from first transmitter Tx1 to first receiver Rx1. Property P12 illustrates the electromagnetic property of the propagation path from first transmitter Tx1 to second receiver Rx2. Similar properties are illustrated for second transmitter Tx2, wherein property P21 illustrates the propagation path from second transmitter Tx2 to first receiver Rx1, and P22 illustrates the propagation path from second transmitter Tx2 to second receiver Rx2.

Tool 10 provides two differential measurements ($M_{RS}$ and $M_{RL}$) from receiver pair 16. $M_{RS}$ is derived from receiver pair 16 using short-spaced transmitter Tx2 and $M_{RL}$ is derived from receiver pair 16 using long-spaced transmitter Tx1. Both of these measurements can be converted to resistivity with functions f and g.

In addition to the two dual-receiver measurements ($M_{RS}$ and $M_{RL}$), two additional differential measurements ($M_{TS}$ and $M_{TL}$) can be made from transmitter pair 14. $M_{TS}$ is derived from transmitter pair 14 using short-spaced receiver Tx2, and $M_{TL}$ is derived from transmitter pair 14 using long spaced transmitter Tx1. If the spacing between transmitter pair 14 is equal to the spacing of receiver pair 16, the functions to convert the dual-transmitter measurements, $M_{TS}$ and $M_{TL}$, into resistivity can be the same functions (f and g) for the dual-receiver measurements from receiver pair 16.

One advantage of this inventive embodiment over a standard borehole compensated device shown in FIG. 2 is that the invention provides two different spacings and two different depths of investigation. Borehole rugosity effects are reduced in this new embodiment by using both the receiver pair 16 measurements and the transmitter pair 14 measurements. This new method of compensation is accomplished by depth shifting to align in depth the data from transmitter pair 14 with the data from receiver pair 16 as illustrated by FIG. 4.

Figure 4:
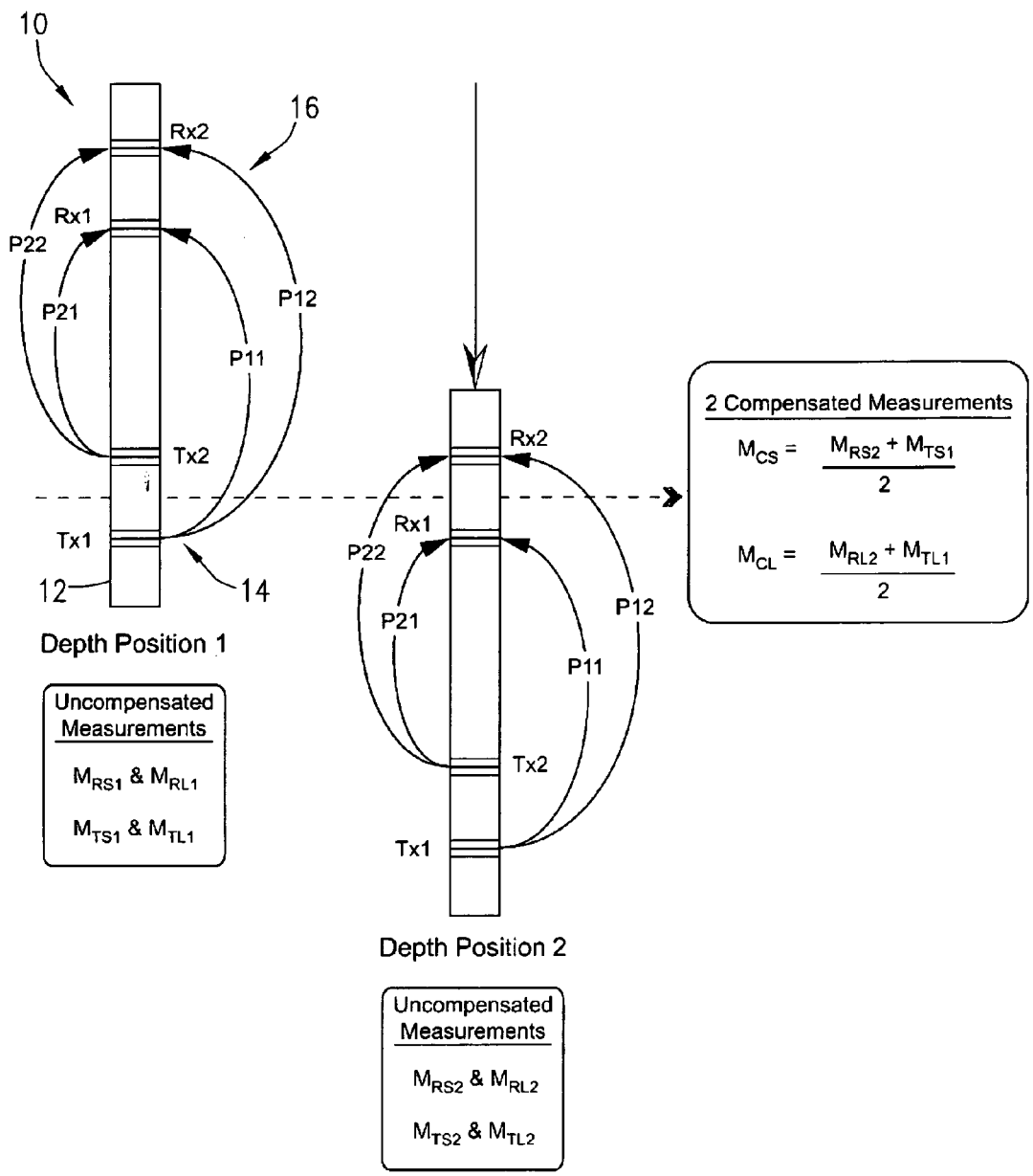
FIG. 4 illustrates a schematic view of two depth positions leading to compensated measurements.

As shown in FIG. 4, an average of receiver pair 16 measurements can be made with transmitter pair 14 measurements to obtain two compensated resistivity measurements. This compensated measurement will have reduced borehole rugosity effects similar to conventional borehole compensated devices. In this manner the invention accomplishes borehole compensation in an apparatus having a tool body significantly shorter than a standard borehole compensated device. In addition, two measurements with different depths of investigation are provided instead of the single depth of investigation provided with the conventional borehole compensated device shown in FIG. 2. As used herein, the term "depth-offset compensation" is used to describe a compensation method using depth aligned receiver pair 16 and transmitter pair 14 data.

FIG. 4 illustrates how the measurements from receiver pair 16 and transmitter pair 14 can be averaged to produce a compensated resistivity. This process can be accomplished by averaging the dual-transmitter propagation measurements with the dual-receiver propagation measurements and then transforming the average measurements into resistivity, or alternatively, by averaging the resistivities computed from the dual-transmitter measurements with the resistivities computed from the dual-receiver measurements.

Figure 5:
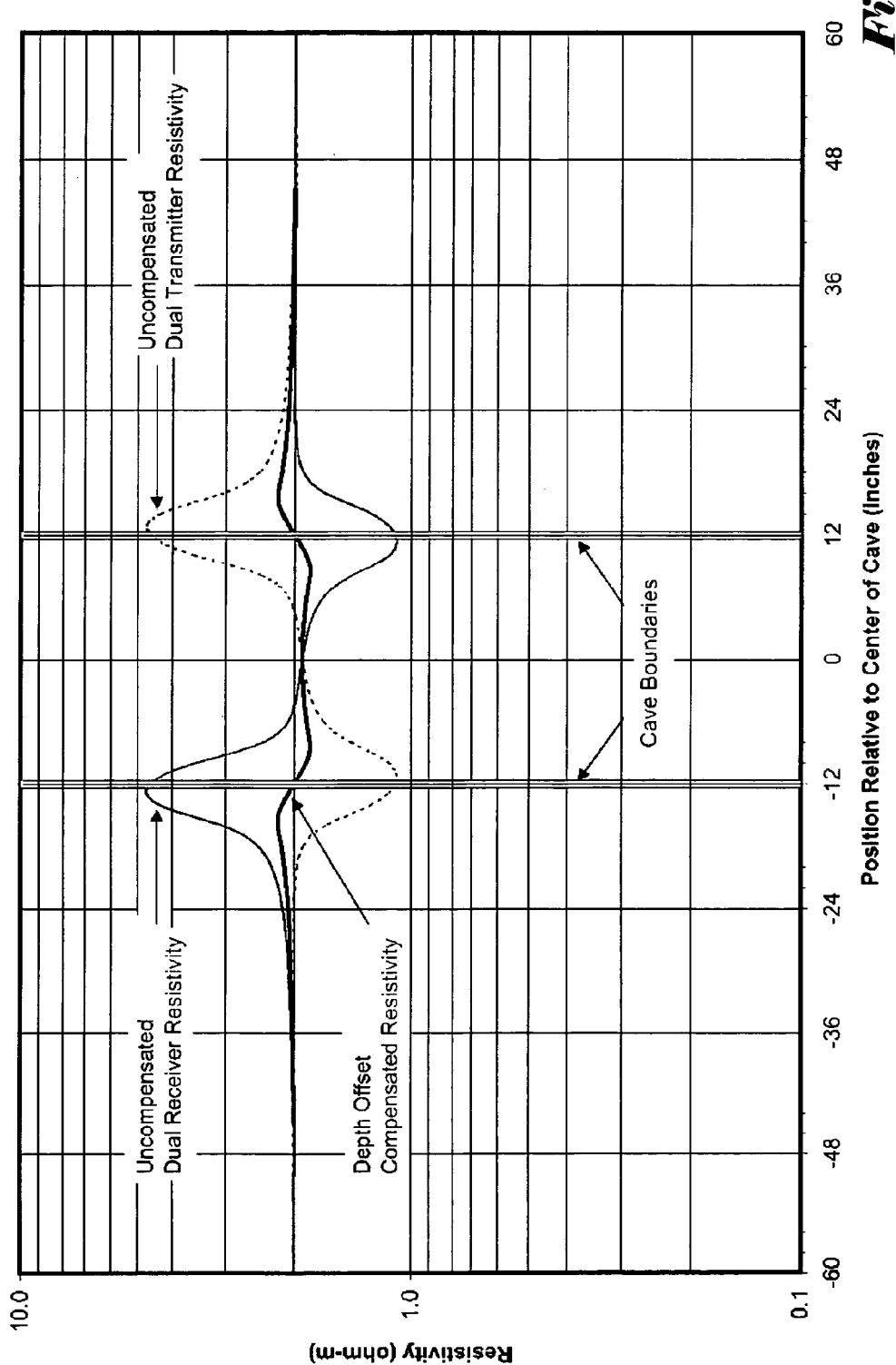
FIG. 5 illustrates the reduction of borehole rugosity effects with a compensated tool.

The reduction of borehole rugosity effects provided with this compensation is illustrated in FIG. 5. As shown in the figure, the effects from a cave or borehole washout that has enlarged the borehole diameter by two inches causes a much smaller deviation on the measured resistivity when comparing the compensated measurement with the uncompensated measurements.

Figure 6:
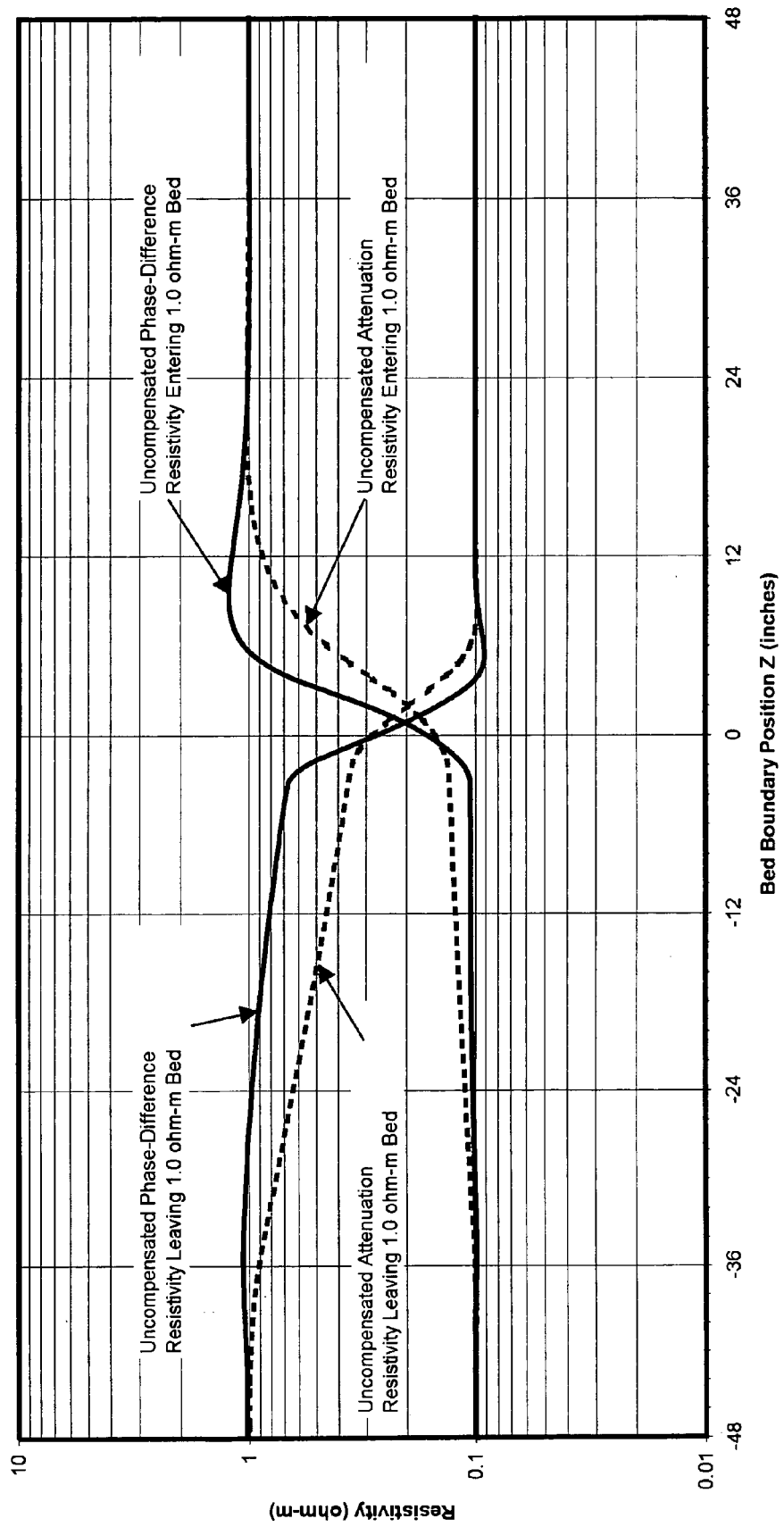
FIG. 6 illustrates the asymmetrical vertical response of an uncompensated tool.

In addition to borehole rugosity effects, the compensated apparatus illustrated in FIG. 4 also removes vertical response asymmetries typically associated with an uncompensated device. This asymmetry shows up at formation bed boundaries wherein the log of measured resistivity as a function of depth from an uncompensated tool will have a different character as the tool enters a conductive bed, when compared to a log as the tool exits a conductive bed. This effect is illustrated in FIG. 6.

Figure 7:
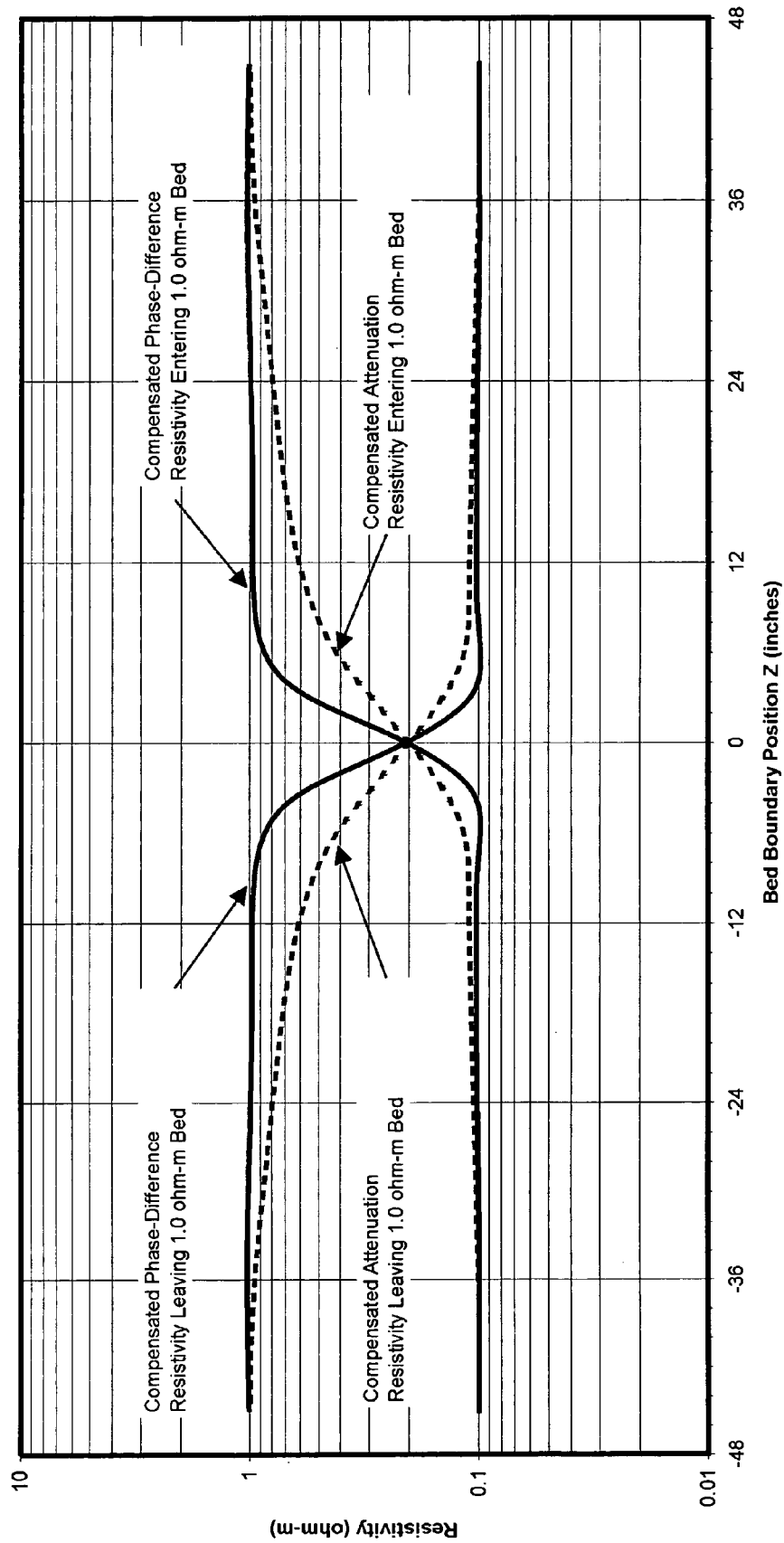
FIG. 7 illustrates the symmetrical vertical response of a compensated tool.

This asymmetrical vertical response effect can be explained by examining the uncompensated measurements from receiver pair 16. As receiver pair 16 of the device enters a resistive bed boundary from the top the respective transmitter has already penetrated the bed. At this position, a larger portion of the propagating electromagnetic wave is contained in the resistive bed. The opposite happens at the bottom bed boundary as the respective transmitter is no longer embedded in the resistive bed as receiver pair 16 transverses the lower bed boundary. In this manner a smaller portion of the propagating electromagnetic wave is contained the resistive bed at this position, and this geometrical effect causes the resistivity log to have a different shape at the top and bottom of formation bed boundaries. By using both receiver pair 16 and transmitter pair 14 measurements, the effects of this vertical response asymmetry are averaged to provide a measurement responding to bed boundaries in a consistent symmetrical fashion regardless of the tool geometry as the tool traverses the bed boundary. The symmetrical response provided by this compensation scheme is shown in FIG. 7.

Receiver and transmitter errors (removed with a standard borehole compensated tool) are still present. The dual-receiver measurements from receiver pair 16 contain receiver errors and the dual-transmitter measurements from transmitter pair 14 contains transmitter errors, however such errors can be compensated with electronic features incorporated in the design of the apparatus as described later in this document.

One embodiment of a depth-offset compensated propagation wave resistivity tool 20 is shown in FIG. 8. Four parameters can describe the location and layout of the tool 20 antennas. These four parameters are the total number of transmitters (J), the total number of receivers (K), the spacings between upper transmitter TxJ and the lower receiver Rx1 ($Z_{min}$), and the spacings between adjacent transmitter and receiver antennas. Four different tool layout examples are illustrated in FIGS. 9 through 12, wherein different combinations of receivers and transmitters are illustrated.

As described above the transmitters are located below the receivers. However, configurations placing the receivers below the transmitters can be used and will have the same response as a device positioning the transmitters below the receivers. Placement of the transmitters and receivers above or below the other depends on the desired implementation.

Figure 13:
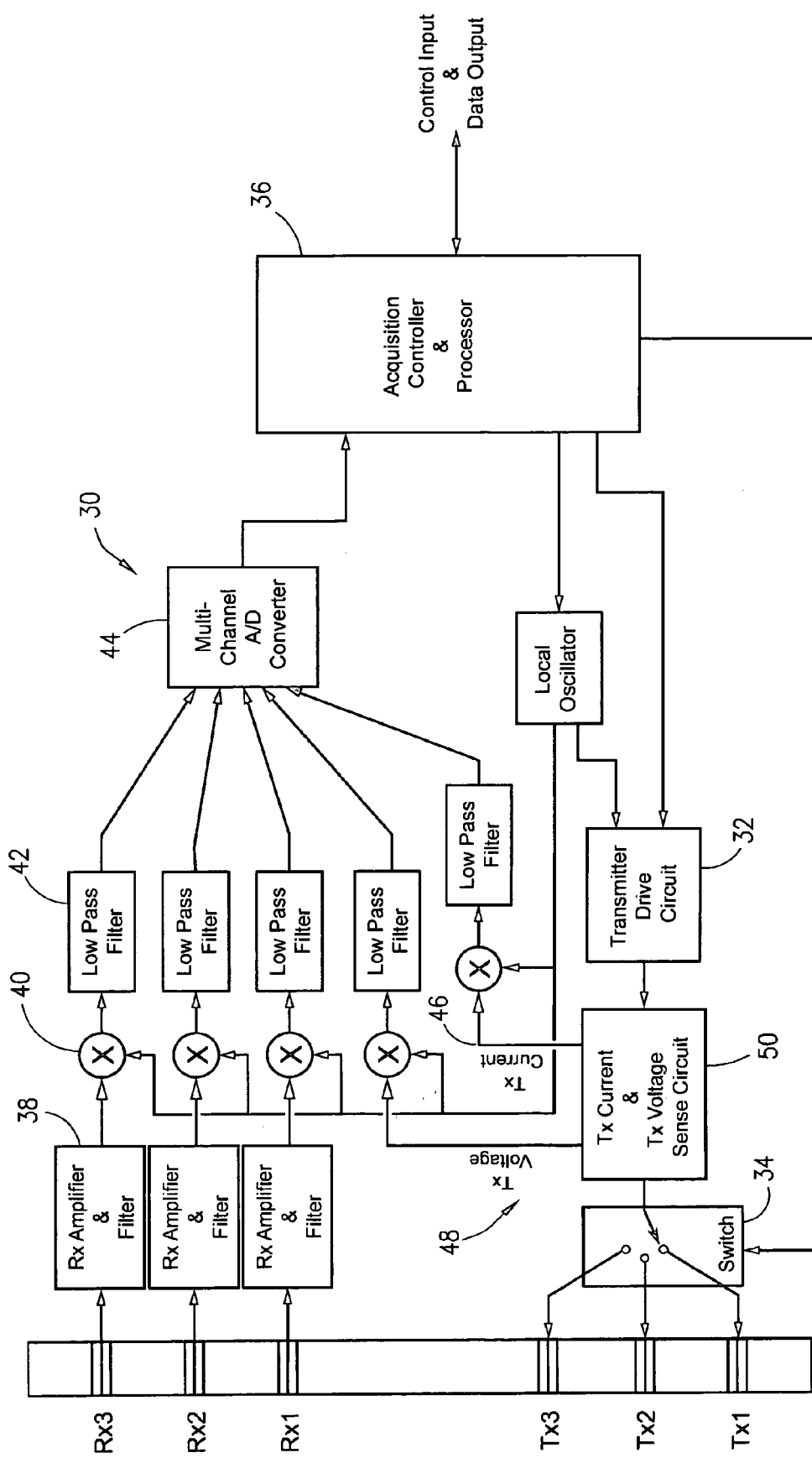
FIG. 13 illustrates a block diagram for a depth offset compensated tool.

The method of depth-offset compensation previously described can be extended to other possible tool layouts by properly aligning in depth the dual-receiver and dual-transmitter data of equal spacing. The total number of different depths of investigation provided by this method is equal to the total number of unique transmitter to receiver-pair spacings ($N_{TRR}$). A block diagram of a 3-transmitter, 3-receiver version of a depth-offset compensated propagation wave resistivity tool 30 is illustrated in FIG. 13. Tool 30 contains a single transmitter circuit 32 that drives one of three different transmitter antennas Tx1, Tx2, and Tx3 via an electronic switch 34. The transmitters are typically selected in sequence under the control of an acquisition routine programmed in acquisition controller and processor 36. Three sets of similar receiver electronics 38 acquire the data from the three receiver antennas Rx1, Rx2, and Rx3 simultaneously. A local oscillator provides the frequency references for both the transmitter and receiver mixer circuits 40. After the mixer 40, the receiver signals are passed through low pass filters 42 and then on to a multi-channel analog-to-digital converter 44.

Acquisition controller and processor block 36 directs the sequencing and timing of the acquisition electronics and also acquires and processes the measurement data. An interface to accept commands from and pass data to the user is also provided by block 36. Such an interface can connect to a telemetry system (not shown) to provide a means to acquire and transmit data in real time such as in the determination of formation resistivity while drilling.

Figure 14:
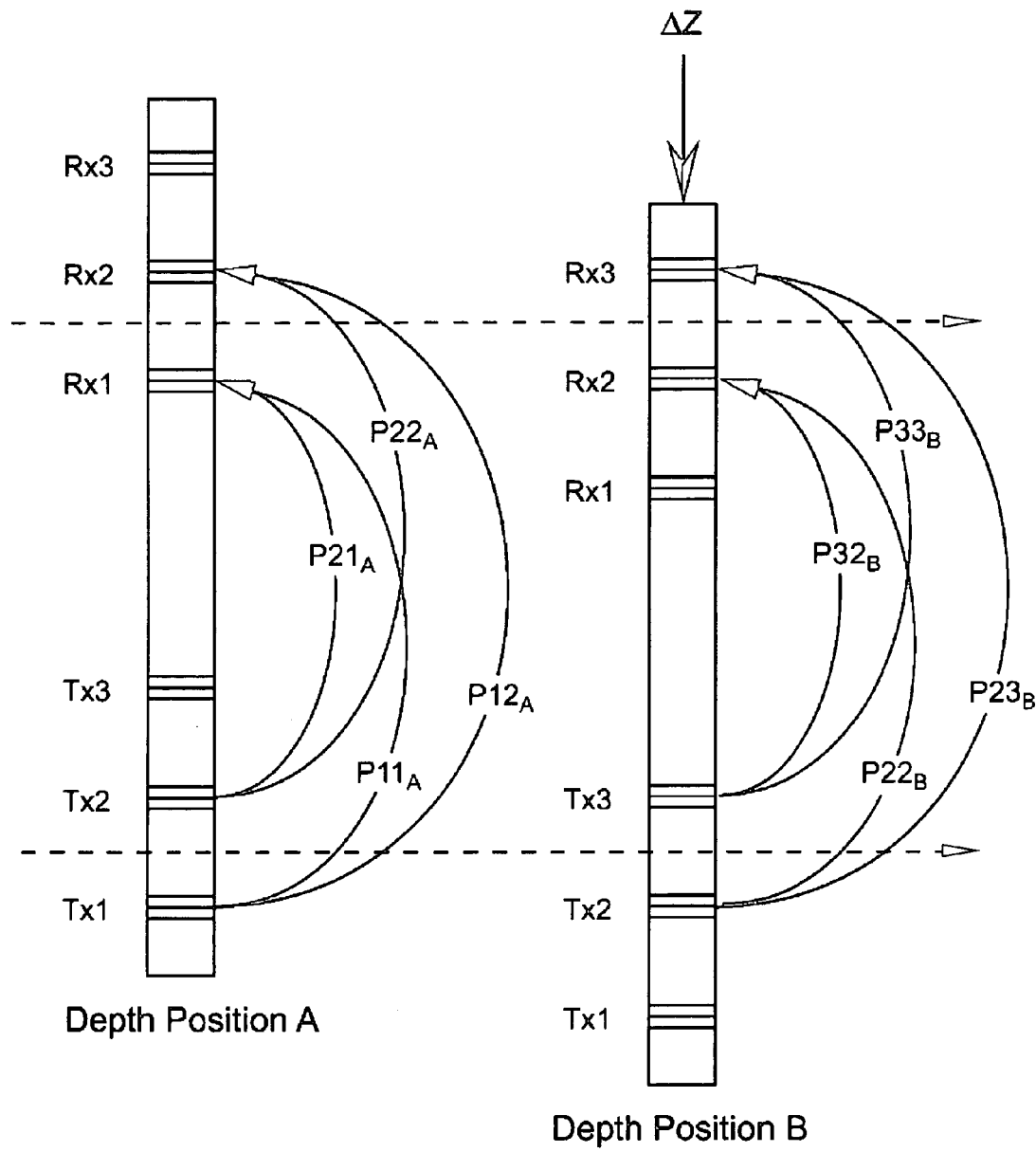
FIG. 14 illustrates the depth alignment process for electronic error compensation.

Although depth-offset compensation reduces the effect of borehole rugosity and provides a symmetrical vertical response, the electronic errors associated with the transmitters and receivers preferably use an additional compensation method. This electronic compensation method involves measuring the transmitter errors directly with an electronic circuit and calculating the receiver errors by depth aligning and comparing equivalent propagation measurements from different transmitter-receiver pairs. This process is illustrated in FIG. 14 for a three-transmitter and three-receiver tool. In this example, the electronic calibration only needs four quantities—the differential propagation measurement error of the two close spaced receiver pairs and the differential propagation measurement error of the two close spaced transmitter pairs. Typically, these differential propagation measurements are attenuation and phase difference, but this calibration process can also be applied to other measurements. Referring to FIG. 14, the transmitter propagation measurements for Tx1 and Tx2 using receiver Rx1 at depth position A can be written as $$A_{11} = E_{Tx1} + P11_A + E_{Rx1},$$

$$A_{21} = E_{Tx2} + P21_A + E_{Rx1},$$

where $E_{Tx1}$ and $E_{Tx2}$ are the errors associated with transmitters Tx1 and Tx2 respectively and $E_{Rx1}$ is the error associated with receiver Rx1. The dual transmitter propagation measurement for Tx1 and Tx2 using Rx1 can be written as $$M_{TM}=A21-A11=(E_{Tx2}+P21_A+E_{Rx1})-(E_{Tx1}+P11_A+E_{Rx1})$$

or $$M_{TM}=(P21_A-P11_A)+(E_{Tx2}-E_{Tx1}). \quad (1)$$

The quantity $(P21_A-P11_A)$ is the differential propagation property to be measured without error. Error associated with receiver Rx1 cancels and the error remaining, $(E_{Tx2}-E_{Tx1})$, is due to transmitters Tx1 and TX2. In this example, $M_{TM}$ is the medium-spaced differential propagation measurement. Similar derivations of the short-spaced, $M_{TS}$ and long-spaced, $M_{TL}$, dual-transmitter propagation measurements can be made. $M_{TS}$ and $M_{TL}$ can be written as $$M_{TS}=A31-A21=(P31_A-P21_A)+(E_{Tx3}-E_{Tx2}) \quad (2)$$

and $$M_{TL}=A23-A13=(P23_A-P13_A)+(E_{Tx2}-E_{Tx1}). \quad (3)$$

As shown in equations 1, 2 and 3, the errors in $M_{TS}$, $M_{TM}$ and $M_{TL}$ are all differential transmitter errors.

These differential transmitter errors are directly measured in the tool by sampling the transmitter current 46 and the transmitter voltage 48 and by deriving correction factors for data acquired with each transmitter pair 14. Outputs from transmitter sense circuit 50 are treated in a similar fashion to the receiver signals and passed to analog-to-digital converter 44. The differential transmitter errors are then calculated by forming the difference of certain characteristics of the sampled transmitter signals. For instance, the differential transmitter phase errors can be calculated from the phase difference of the sampled signals and the differential transmitter attenuation errors can be calculated from the difference of the amplitudes of the sampled transmitter signals. Since these transmitter sense outputs are processed with the same circuits, any systematic errors associated with the acquisition circuits are removed when these differential corrections are calculated. After the differential transmitters errors have been calculated from the sampled transmitter signals such errors can be subtracted from $M_{TS}$, $M_{TM}$ and $M_{TL}$ to remove errors associated with the transmitter elements of the system.

In a similar manner, expressions for the dual-receiver propagation measurements can be derived. Referring to FIG. 14, the receiver propagation measurements for Rx1 and Rx2 using receiver Tx2 at depth position A can be written as $$A_{22}=E_{Tx2}+P22_A+E_{Rx2},$$

$$A_{21}=E_{Tx2}+P21_A+E_{Rx1}.$$

The dual-receiver propagation measurement, $M_{RM}$, can then be written as $$M_{RM}=A21-A22=(E_{Tx2}+P21_A+E_{Rx1})-(E_{Tx2}+P22_A+E_{Rx2})$$

or $$M_{RM}=(P21A-P22A)+(E_{Rx1}-E_{Rx2}). \quad (4)$$

Similar derivations of the short-spaced, $M_{RS}$ and long-spaced, $M_{RL}$, dual-receiver propagation measurements can be made. $M_{RS}$ and $M_{RL}$ can be written as $$M_{RS}=(P31A-P32A)+(E_{Rx1}-E_{Rx2}). \quad (5)$$

and $$M_{RL}=(P12A-P13A)+(E_{Rx2}-E_{Rx3}). \quad (6)$$

As shown in equations 4, 5 and 6, the errors in $M_{RS}$, $M_{RM}$ and $M_{RL}$ are all differential receiver errors.

The differential receiver errors can be determined with the use of the transmitter error measurements described above and with a process that involves depth aligning and comparing equivalent propagation measurements from different transmitter-receiver pairs. Referring again to FIG. 14, the tool body has been moved by amount $\Delta Z$ from depth position A to depth position B. As illustrated in FIG. 14, a number of propagation paths at position A are equivalent to other propagation paths at position B. For instance, $P11_A$ is equivalent to $P22_B$, $P12_A$ is equivalent to $P23_B$, etc. If no transmitter or receiver errors are present in the system, the measurement A11 for propagation path $P11_A$ will be equal to the measurement B11 for propagation path $P22_B$. From the above references to transmitter errors, the measurement A11 can be written as $$A_{11}=E_{Tx1}+P11_A+E_{Rx1}.$$

Similarly, the expression for B22 can be written as $$B22=E_{Tx2}+P22_B+E_{Rx2},$$

Forming the difference of A11 and B22 results in $$A11-B22=(E_{Tx1}+P11_A+E_{Rx1})-(E_{Tx2}+P22_B+E_{Rx2})$$

which simplifies to $$A11-B22=(E_{Rx1}-E_{Rx2})+(E_{Tx1}-E_{Tx2})+(P11_A-P22_B).$$

The term $(P11_A-P22_B)$ is equal to zero since the propagation paths are identical. This permits the differential receiver error to be expressed as $$(E_{Rx1}-E_{Rx2})=(A11-B22)+(E_{Tx2}-E_{Tx1})$$

Similarly, the remaining differential receiver error can be expressed as $$(E_{Rx2}-E_{Rx3})=(A22-B33)+(E_{Tx3}-E_{Tx2}).$$

The invention permits determination of all four of the required differential measurement errors, including the two differential-transmitter measurement errors and the two differential-receiver measurement errors. With the differential errors defined, the differential-transmitter errors can be subtracted from the appropriate dual-transmitter measurements, $M_{TS}$, $M_{TM}$ and $M_{TL}$ and the differential-receiver errors from the appropriate dual-receiver measurements, $M_{RS}$, $M_{RM}$ and $M_{RL}$, thereby providing propagation measurements free of the errors associated with the transmitter and receiver elements of the system.

Other differential errors can be identified, such as the differential receiver error $(E_{Rx1}-E_{Rx2})$ derived from the measurements A11 and B22. An alternate relationship using A21 and B32 can be used to obtain another expression for $(E_{Rx1}-E_{Rx2})$ as follows:

$$(E_{Rx1}-E_{Rx2})=(A21-B32)+(E_{Tx3}-E_{Tx2}).$$

Similar alternate versions of $(E_{Rx2}-E_{Rx3})$ can also be derived, thereby reducing noise in the differential errors by averaging all of the possible determinations of each differential error. In addition, noise in the differential errors can be further reduced by averaging the determined values over depth since they will not vary directly as a function of depth. This occurs because the primary mechanism for causing drifts in the differential errors is time, temperature or pressure and not depth.

The controller is capable of producing a compensated resistivity measurement of the geologic formation by averaging uncompensated dual-receiver resistivity measurements with uncompensated dual-transmitter resistivity measurements of the geologic formation taken from two selected locations within the borehole. This averaging provides a compensated resistivity measurement with symmetrical vertical response and reduced effects from borehole rugosity. The controller can also be capable of producing a compensated resistivity measurement of the geologic formation by averaging dual-receiver propagation measurements (such as attenuation and phase difference) with dual-transmitter propagation measurements of the geologic formation taken from two selected locations within the borehole. This averaging results in a compensated resistivity measurement with a symmetrical vertical response and reduced effects from borehole rugosity.

Compensation of errors from the transmitting and receiving elements of the system can be made by measuring currents and voltages generated by first and second transmitters, by measuring currents and voltages of the electrical signals generated by the first and second receivers, and by operating the controller to derive corrections for the transmitter propagation errors from the differences between such current and voltage measurements. In addition, the controller can be operated to derive receiver propagation errors from the corrections for the transmitter propagation errors and from depth aligned receiver propagation measurements.

The invention has significant advantages over prior art tools. Such advantages include a shorter tool length, multiple depths of investigation with fewer antennas, compensation for the asymmetrical vertical response of electromagnetic wave tools, compensation for borehole rugosity effects, and compensation for the errors caused by the transmitter and receiver elements of the apparatus.

Hence, compensation of the data acquisition errors associated with the dual-transmitter measurements are removed with electronic circuits that measure the transmitter current and voltage. The data acquisition errors associated with the dual-receiver measurements are removed by making use of the electronic transmitter error compensation and by deriving correction factors from the data acquired with each receiver. This receiver error compensation process requires, as previously described, a technique of depth alignment of similar propagation measurements to determine errors introduced by the receiver data acquisition electronics.

In a second embodiment, which is the preferred embodiment of this application, an apparatus and method to correct, in real time, data acquisition errors of propagation wave devices that use multiple receivers to measure propagation parameters such as attenuation and phase difference, will be described with reference to FIGS. 15 and 16. This second preferred embodiment does not require the use of depth aligned propagation measurements to remove errors in the dual-receiver measurements introduced by the receiver data acquisition system. This simplifies the correction of receiver element errors and allows these corrections to be performed in real time in a processor downhole.

Figure 15:
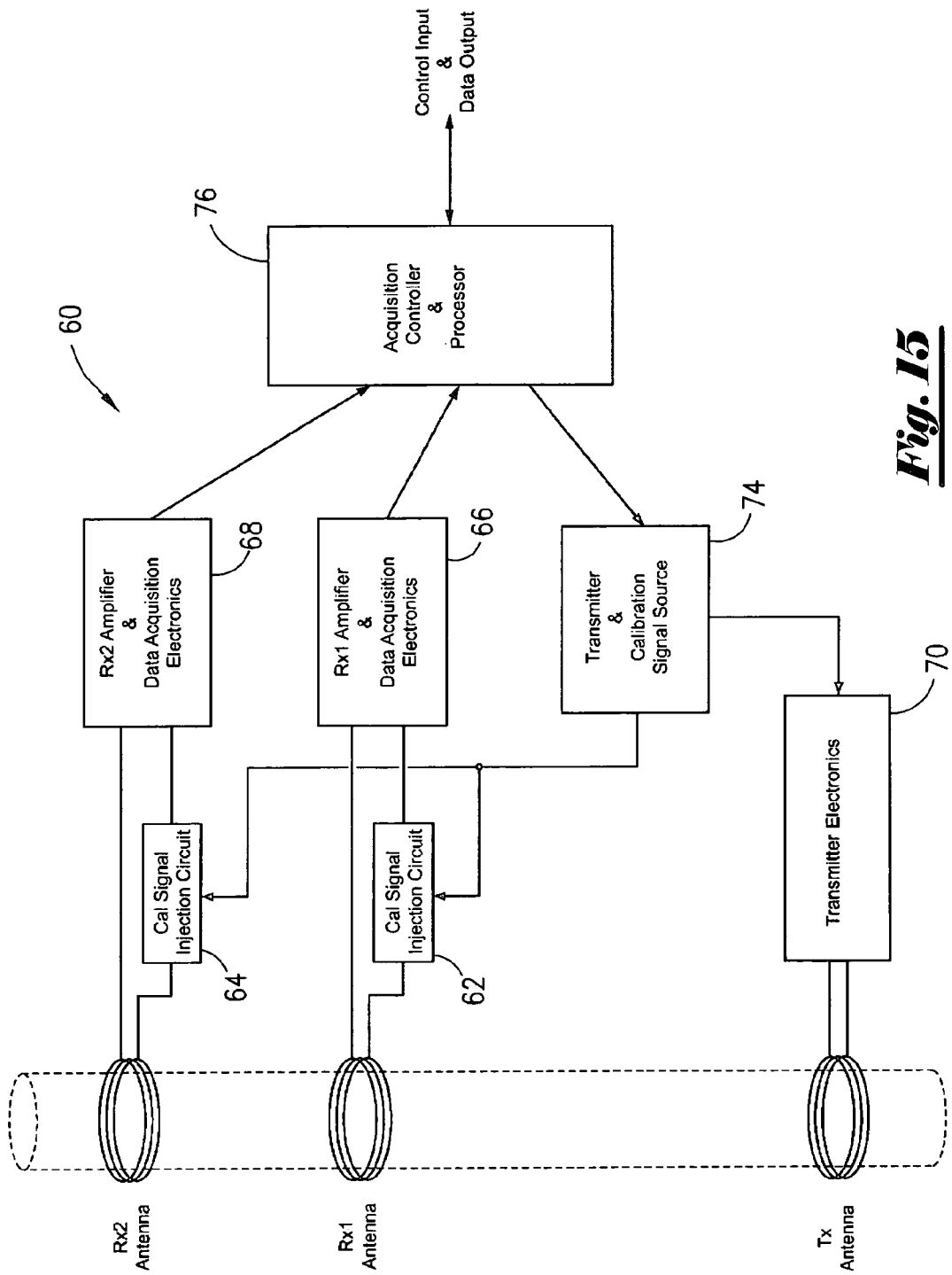
FIG. 15 illustrates a block diagram of a propagation wave resistivity device incorporating features that provide for automatic calibration of receiver data acquisition errors.

Referring now to FIG. 15, a block diagram of a second preferred propagation wave resistivity device 60 incorporating features that provide for automatic calibration of receiver data acquisition errors will now be described.

FIG. 15 outlines the basic concept of the new receiver calibration scheme. As shown in FIG. 15, a calibration signal is injected via calibration signal injection circuits 62, 64 into the front end of each receiver (Rx1 and Rx2). This calibration signal is applied in series with the receiver antennas Rx1 and Rx2 and as a result is electrically added to the received signal. Both the received signal and the injected calibration signal are processed with the receiver data acquisition electronics and amplifier 66, 68 respectively. By measuring both the received signal and the calibration signal with the same acquisition electronics, the errors of the acquisition electronics can be eliminated.

The operation of the resistivity device 60 is similar to the operation of the resistivity tool 30 discussed in relation to FIG. 13. The preferred embodiment of FIG. 15 depicts a pair of receivers, Rx1, Rx2, and the calibration signal injection circuits 62, 64. The transmitter electronics 70 generates a signal that causes transmitter antenna Tx to generate an electromagnetic propagation wave. The transmitter electronics 70 is controlled from the transmitter and calibration signal source means 74, which in turn is controlled by the acquisition controller and processor 76.

The receivers Rx1, Rx2 receive the signal that has propagated from the transmitter, Tx. This signal is then communicated to the amplifier and data acquisition electronic means 66, 68, respectively. As noted earlier, the calibration signal injection circuits 62, 64 has injected the calibration signal into the front-ends of receivers Rx1, Rx2. The data acquisition electronics 66, 68 will measure both the received signal and the calibration signal, which in turn will be communicated to the acquisition controller and processor 76. The acquisition controller and processor 76 will compute the phase difference, and in turn compute resistivity.

To illustrate the method used to remove the data acquisition errors, the measurement of the dual-receiver phase difference will be presented. $\theta_{Rx1}$ and $\theta_{Rx2}$ represent the true phase of the received signals from antennas Rx1 and Rx2. Also, $\phi_{E1}$ represents the phase errors introduced by the acquisition electronics of Rx1 and $\phi_{E2}$ represent the phase errors introduced by the acquisition electronics of Rx2. The resulting measured phases can then be expressed as $$\theta_{M1} = \theta_{Rx1} + \phi_{E1}$$

$$\theta_{M2} = \theta_{Rx2} + \phi_{E2}$$

The dual-receiver phase difference measurement is computed by forming the difference $$PD_{uc} = \theta_{M1} - \theta_{M2}$$

$$PD_{uc} = (\theta_{Rx1} + \phi_{E1}) - (\theta_{Rx2} + \phi_{E2})$$

Rewriting $PD_{uc}$ we get $$PD_{uc} = (\theta_{Rx1} - \theta_{Rx2}) + (\phi_{E1} - \phi_{E2}) \tag{7}$$

As shown in the above equation, the measured phase difference, $PD_{uc}$, contains an error term associated with the phase errors introduced by the acquisition electronics of Rx1 and Rx2. $PD_{uc}$ is the un-calibrated phase-difference measurement.

Letting $\theta_{Cal}$ represent the phase of the calibration signal, the measured phase of the injected calibration signal can be expressed as $$\theta_{MC1} = \theta_{Cal} + \phi_{E1}$$

$$\theta_{MC2} = \theta_{Cal} + \phi_{E2}$$

We can then use the measured calibration phases to correct for the errors, $\phi_{E1}$ and $\phi_{E2}$, introduced into the dual-receiver phase difference measurement.

$$PD = PD_{uc} - (\theta_{MC1} - \theta_{MC2})$$

$$PD = (\theta_{Rx1} - \theta_{Rx2}) + (\phi_{E1} - \phi_{E2}) - (\theta_{MC1} - \theta_{MC2})$$

$$PD = (\theta_{Rx1} - \theta_{Rx2}) + (\phi_{E1} - \phi_{E2}) - ((\theta_{Cal} + \phi_{E1}) - (\theta_{Cal} + \phi_{E2}))$$

$$PD = (\theta_{Rx1} - \theta_{Rx2}) \tag{8}$$

As shown in the above equation (8), PD is free of the errors associated with the acquisition electronics. Also, the above equation shows how the quantity, $\theta_{Cal}$, cancels out indicating the value of $\theta_{Cal}$ does not need to be known in order to remove the acquisition electronic errors from the phase difference measurement.

Although the above example illustrates how the apparatus and method can be applied to the phase-difference propagation measurement, the same technique can be applied to other propagation measurements. For instance, the dual-receiver attenuation measurement can be calibrated using the same process. The method is identical to the phase-difference calibration method except for the substitution of the signal phases with the corresponding signal amplitude levels expressed in decibels. The relationships for the attenuation example are as follows:

$$AT = (A_{M1} - A_{M2}) - (A_{MC1} - A_{MC2}),$$

$$AT = (A_{Rx1} - A_{Rx2}) + (A_{E1} - A_{E2}) - (A_{MC1} - A_{MC2})$$

$$AT = (A_{Rx1} - A_{Rx2}) + (A_{E1} - A_{E2}) - ((A_{Cal} + A_{E1}) - (A_{Cal} + A_{E2}))$$

$$AT = (A_{Rx1} - A_{Rx2}) \tag{9}$$

Wherein AT is the attenuation, expressed in decibels, free from errors;

$A_{M1}$ is the measured amplitude expressed in decibels of the uncalibrated signal from the first receiver;

$A_{M2}$ is the measured amplitude, expressed in decibels of the uncalibrated signal from the second receiver.

$A_{MC1}$ is the measured amplitude, expressed in decibels, of the calibration signal from the first receiver element;

$A_{MC2}$ is the measured amplitude, expressed in decibels, of the calibration signal from the second receiver element;

$A_{Rx1}$ is the true amplitude, expressed in decibels, of the received signal at the first receiver;

$A_{Rx2}$ is the true amplitude, expressed in decibels, of the received signal at the second receiver;

$A_{Cal}$ is the true amplitude, expressed in decibels, of the calibration signal;

$A_{E1}$ is the error, expressed in decibels, introduced in the amplitude measurement by the elements of the first receiver;

$A_{E2}$ is the error, expressed in decibels, introduced in the amplitude measurement by the elements of the second receiver.

According to the teachings to the teachings of this invention, there are at least two ways that the calibration signal can be injected and measured. The first is time-multiplexing. If the frequency of the calibration signal is selected to be exactly the same as the frequency of the received signal, the two signals will interfere with each other if the calibration signal is injected when the received signal is present. The acquisition controller can overcome signal interference by time-multiplexing the received signal with the calibration signal. This is accomplished by having the acquisition controller sequentially activate the transmitter and then the calibration signal circuits. This provides a time-multiplexed series of received data with calibration data.

A second method that could be used is frequency domain multiplexing. The method separates the calibration signal from the received signal by a small difference in frequency. As long as the frequency difference is selected to be $$\Delta F = N/t_a, \tag{10}$$

where N is an integer and $t_a$ is the acquisition time interval, the two signals can be processed independently. Forcing $\Delta F$ by the above constraint insures that the received signal can be exactly canceled out while processing the calibration signal and the calibration signal can be exactly canceled out while processing the received signal. Making $\Delta F$ small insures that the acquisition electronic errors that affect the received signal can be accurately measured by the calibration signal. For example, if the received signal is assumed to be at 2.00 MHz, and the acquisition time interval is 1.0 second, $\Delta F$ can be equal to 10 Hz. This would place the calibration signal at 2.000010 MHz and the received signal at 2.000000 MHz. At this relatively small frequency separation, the electronic errors measured with the calibration signal would accurately reflect the errors introduced into the received signal.

One important aspect of the apparatus used for the calibration is the differential accuracy of the injected calibration signals. That is, there needs to be very small differences or known and stable differences in the calibration signals injected into each receiver. Any unaccounted differences between the two calibration signals will result in errors in the final propagation measurement. For example, in the case of the phase-difference measurement, the phase of the injected calibration signal into Rx1 has to be equal to the phase of the injected calibration signal into Rx2. If there are any phase differences in the two calibrations signals, these differences must be known and unchanging. As a result, the implementation of the calibration apparatus is important.

Figure 16:
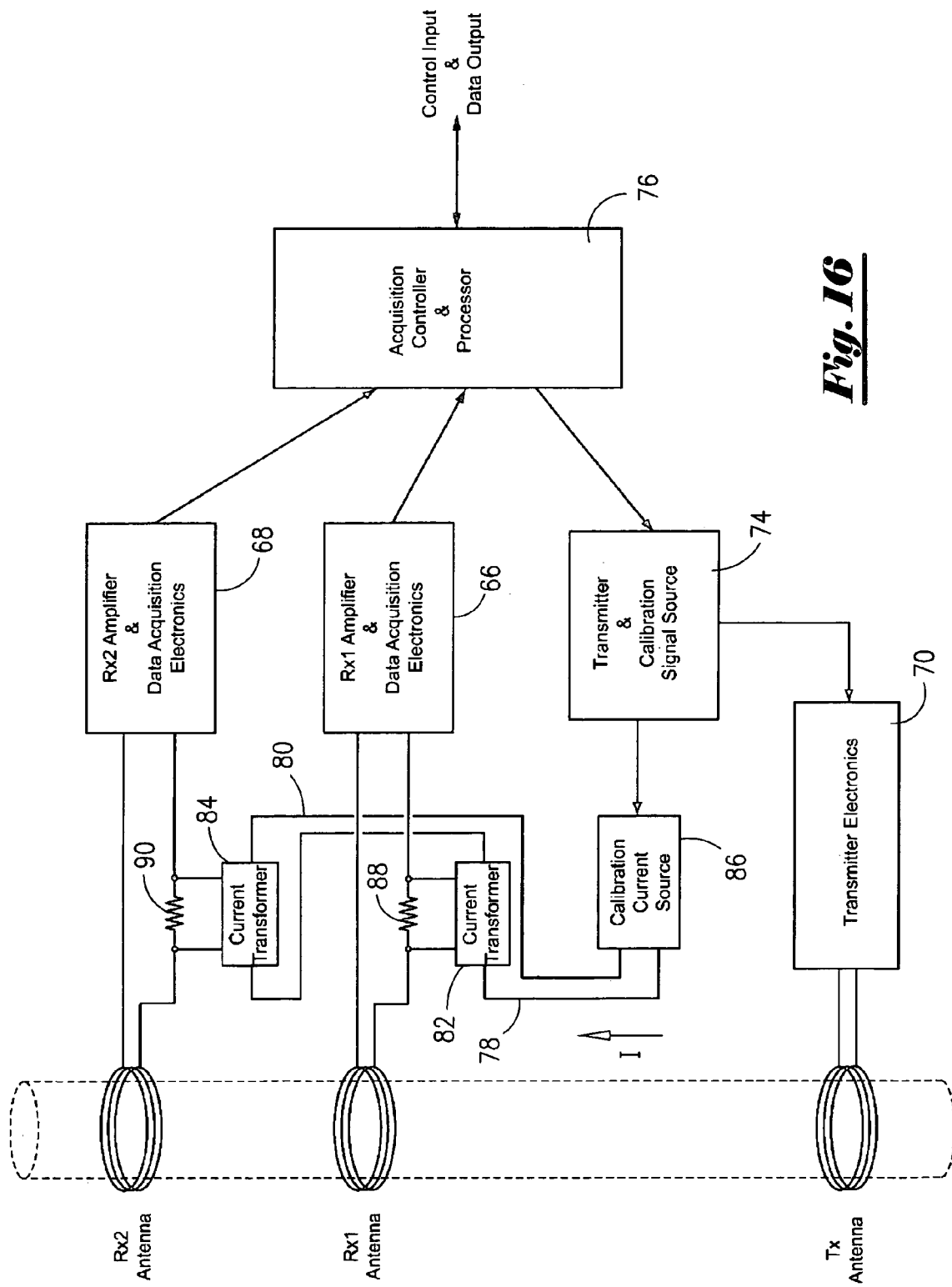
FIG. 16 illustrates a block diagram of a propagation wave resistivity device incorporating a calibration current loop and current transformers to inject receiver calibration signals into the front end of the receiver.

Referring now to FIG. 16, a preferred embodiment of the apparatus that will minimize differential calibration errors is shown. It should be noted that like numbers in the various figures refer to like components. In this embodiment, the calibration signals are injected into the receiver front ends of Rx1, Rx2 using a current loop 78, 80. A calibration current source means 86, which is electrically communicated with the transmitter and calibration signal source 74, generates a current, I, that is communicated to current loop 78, 80. Current transformers 82, 84, placed in the current loop 78, 80 and located near the front end of the receiver, sample the current in the loop of the respective receivers Rx1/Rx2. Through a low value resistor 88, 90 on the secondary of the current transformer, the sampled current is converted to a small voltage that is added in series with the received signal. Since the amplitude and phase of the current flowing in the current loop is essentially equal at any point in the loop, the calibration signals produced at each receiver will track and minimize any potential differential calibration signal errors. The current transformers also provide voltage isolation between receivers and prevent any cross coupling of the receiver signals.

This disclosure has discussed the application of this invention to a device with two receivers. However, both the apparatus and method can be extended to any device with more than two receivers. For example, the invention can be applied to a device with three receivers (as seen in FIG. 11) by injecting calibration signals into the third receiver in a manner similar to the first two receivers. The method could then compute three differential calibration quantities: one for the Rx1/Rx2 pair, one for the Rx2/Rx3 pair and one for the Rx1/Rx3 pair. For a four-receiver device, the method could compute calibration quantities for six different pairs, Rx1/Rx2, Rx2/Rx3, Rx3/Rx4, Rx1/Rx3, Rx2/Rx4, and Rx1/Rx4. In general terms, the invention can be used to calibrate K total differential-receiver pairs where K is defined as $$K = \sum_{i=1}^{N-1} i, \qquad (11)$$

and N equals the total number of receivers.

Although the invention has been described in terms of certain preferred embodiments, it will become apparent to those of ordinary skill in the art than modifications and improvement can be made to the inventive concepts herein within departing from the scope of the invention. The embodiments shown herein are merely illustrative of the inventive concepts and should not be interpreted as limiting the scope of the invention.

I claim:

1. A method of obtaining an electromagnetic propagation measurement of a subterranean geologic formation, said geologic formation being intersected by a borehole, the method comprising:
   providing a device within the borehole, said device comprising: a transmitter, located on said device, for transmitting a signal; a first receiver and a second receiver located on said device, for receiving the transmitted signal; and, a processor means for processing the received signals;
   generating the signal from the transmitter;
   receiving the transmitted signal at the first and second receiver;
   injecting a calibration signal with a calibration circuit into the first receiver and the second receiver;
   processing the receiver signal and the calibration signal within the processor means and wherein the step of processing the receiver signal and the calibration signal includes calculating a phase difference free of data acquiring errors by computing the phase difference as follows:

$PD = (\theta_{M1} - \theta_{M2}) - (\theta_{MC1} - \theta_{MC2})$

Wherein PD is the phase difference free from acquisition errors;
   $\theta_{M1}$ is the measured phase of the uncalibrated receiver signal from the first receiver;
   $\theta_{M2}$ is the measured phase of the uncalibrated receiver signal from the second receiver;
   $\theta_{MC1}$ is the measured phase of the calibration signal from the first receiver; and,
   $\theta_{MC2}$ is the measured phase of the calibration signal from the second receiver:
   correcting data acquisition errors related to the receiver and the second receiver;
   determining the electromagnetic propagation measurement.

2. The method of claim 1 wherein the step of processing the receiver signal and the calibration signal further includes calculating an attenuation free of data acquiring errors by computing the attenuation as follows:

$AT = (AT_{M1} - AT_{M2}) - (AT_{MC1} - AT_{MC2})$

Wherein AT is the attenuation, expressed in decibels, free from acquisition errors;
   $A_{M1}$ is the measured amplitude, expressed in decibels, of the uncalibrated receiver signal from the first receiver;
   $A_{M2}$ is the measured amplitude, expressed in decibels, of the uncalibrated receiver signal from the second receiver.
   $A_{MC1}$ is the measured amplitude, expressed in decibels, of the calibration signal from the first receiver
   $A_{MC2}$ is the measured amplitude, expressed in decibels, of the calibration signal from the second receiver.

3. The method of claim 1 wherein the calibration signal is at a first frequency and the received signal is at the first frequency and the method further comprising:
   time multiplexing the receiver signal with the calibration signal.

4. The method of claim 3 wherein the step of time multiplexing includes sequentially activating the transmitter and then the calibration circuit.

5. The method of claim 1 wherein the step of injecting the calibration signal includes separating the calibration signal from the receiver signal by providing a difference in frequency with a frequency domain multiplexing circuit operatively associated with said processor means.

6. The method of claim 5 wherein the frequency difference is selected as follows:

$\Delta F = N/t_a$

Wherein $\Delta F$ is the frequency difference;
   N is an integer;
   $t_a$ is the acquisition time interval.

7. The method of claim 1 wherein the step of injecting the calibration signal includes:
   adding the calibration signal in series with the first receiver and the second receiver.

8. The method of claim 1 wherein the calibration signal is injected into the receiver front ends using a current loop.

9. The method of claim 8 wherein the current loop has a current transformer placed therein and the method further includes sampling the current in the loop with a current sampling resistor on the current transformer.

10. The method of claim 1 wherein the device is provided with a third receiver and the method further comprises injecting the calibration signal into the third receiver.

11. The method of claim 10 further comprises:
    computing a differential calibration quantity for the first receiver and the second receiver;
    computing the differential calibration quantity for the second receiver and the third receiver; and,
    computing the differential calibration quantity for the first receiver and the third receiver.

12. A device for obtaining an electromagnetic propagation measurement of a subterranean geologic formation, said subterranean formation being intersected by a borehole, the device comprising:
    a transmitter, located on said device, for transmitting an electromagnetic signal;
    a first receiver and a second receiver located on said device, for receiving the transmitted electromagnetic signal;
    means for measuring and correcting for errors related to the transmitter;
    means for injecting a calibration signal into the first receiver and the second receiver;
    means for processing the receiver signal and the calibration signal to obtain the electromagnetic propagation measurement;
    receiver data acquisition circuit for correcting data acquisition errors related to the first receiver and the second receiver;
    and wherein the processing means further comprises means for computing an attenuation free of errors as follows:

$$AT=(AT_{M1}-AT_{M2})-(AT_{MC1}-AT_{MC2});$$

Wherein AT is the attenuation, expressed in decibels, free from acquisition errors;

$A_{M1}$ is the measured amplitude, expressed in decibels, of the uncalibrated receiver signal from the first receiver;

$A_{M2}$ is the measured amplitude, expressed in decibels, of the uncalibrated receiver signal from the second receiver;

$A_{MC1}$ is the measured amplitude, expressed in decibels, of the calibration signal from the first receiver:

$A_{MC2}$ is the measured amplitude, expressed in decibels, of the calibration signal from the second receiver.

13. The device of claim 12 wherein the signal injecting means includes means for applying the calibration signal in series with the first receiver and the second receiver.

14. The device of claim 13 wherein the device is provided with a third receiver and the device further comprises means for injecting the calibration signal into the third receiver.

15. The device of claim 14 further comprises:
means for computing a differential calibration quantity for the first receiver and the second receiver;
means for computing the differential calibration quantity for the second receiver and the third receiver; and,
means for computing the differential calibration quantity for the first receiver and the third receiver.

16. The device of claim 12 wherein the processing means further comprises means for computing a phase difference free of errors as follows:

$$PD=(\theta_{M1}-\theta_{M2})-(\theta_{MC1}-\theta_{MC2})$$

Wherein PD is the phase difference free from acquisition errors;

$\theta_{M1}$ is the measured phase of uncalibrated receiver signal from the first receiver;

$\theta_{M2}$ is the measured phase of the uncalibrated receiver signal from the second receiver.

$\theta_{MC1}$ is the measured phase of the calibration signal from the first receiver $\theta_{MC2}$ is the measured phase of the calibration signal from the second receiver.

17. The device of claim 12 wherein the calibration signal is at a first frequency and the receiver signal is at the first frequency and the device further comprises:
means, operatively associated with the processing means, for time multiplexing the uncalibrated receiver signal with the calibrated signal.

18. The device of claim 17 wherein the time multiplexing means includes means for sequentially activating the transmitter and the calibration injection means.

19. The device of claim 12 further comprises a frequency domain multiplexing means, operatively associated with the processing means, for separating the calibration signal from the receiver signal by a difference in frequency.

20. The device of claim 19 wherein the frequency difference of the frequency domain multiplexing means is selected as follows:

$$\Delta F = N/t_a$$

Wherein $\Delta F$ is the frequency difference;
N is an integer;
$t_a$ is the acquisition time interval.

21. The device of claim 20 wherein the frequency domain multiplexing means cancels out the receiver signal while processing the calibration signal, and cancels out the calibration signal while processing the receiver signal.

22. The device of claim 12 wherein the calibration signal is added in series with the first receiver and the second receiver.

23. The device of claim 22 wherein the calibration signal is injected into the first receiver and the second receiver front ends using a current loop.

24. The device of claim 23 wherein the current loop has a current transformer placed therein and the device further includes means for sampling the current in the loop with a current sampling resistor.

25. A method of obtaining an electromagnetic propagation measurement of a subterranean geologic formation, said subterranean formation being intersected by a borehole, the method comprising:
providing a device within the borehole, said device comprising: a transmitter, located on said device, for transmitting an electromagnetic signal; a first receiver and a second receiver located on said device, for receiving the transmitted signal;
transmitting the signal from the transmitter;
receiving the signal at the first and second receiver;
measuring the current and voltages associated with the transmitter and operating a processor to derive corrections for the transmitter errors from the differences between the current and voltage measurements;
injecting a calibration signal into the first receiver and the second receiver;
processing the receiver signal and the calibration signal within the processor for obtaining the electromagnetic propagation measurement of the subterranean formation which includes removing data acquisition errors associated with the first receiver and the second receiver and wherein the step of processing the receiver signal and the calibration signal includes obtaining a phase difference measurement, and wherein the phase difference measurement is computed as follows:

$$PD=((\theta_{M1}-\theta_{M2})-(\theta_{MC1}-\theta_{MC2}),$$

Wherein PD is the phase difference free from acquisition errors;

$\theta_{M1}$ is the measured phase of receiver signal from the first receiver;

$\theta_{M2}$ is the measured phase of the receiver signal from the second receiver;

$\theta_{MC1}$ is the measured phase of the calibration signal from the first receiver;

$\theta_{MC2}$ is the measured phase of the calibration signal from the second receiver.

26. The method of claim 25 wherein the step of processing the receiver signal and the calibration signal includes obtaining an attenuation measurement, and wherein the attenuation measurement is computed as follows:

$$AT=(AT_{M1}-AT_{M2})-(AT_{MC1}-AT_{MC2})$$

Wherein AT is the attenuation, expressed in decibels, free from acquisition errors;

$A_{M1}$ is the measured amplitude, expressed in decibels, of the uncalibrated receiver signal from the first receiver;

$A_{M2}$ is the measured amplitude, expressed in decibels, of the uncalibrated receiver signal from the second receiver.

$A_{MC1}$ is the measured amplitude, expressed in decibels, of the calibration signal from the first receiver $A_{MC2}$ is the measured amplitude, expressed in decibels, of the calibration signal from the second receiver.

27. The method of claim 25 wherein the calibration signal is at a first frequency and the receiver signal is at the first frequency and the method further comprises:
time multiplexing the receiver signal with the calibrated signal.

28. The method of claim 27 wherein the step of multiplexing is accomplished by sequentially activating the transmitter and then a calibration circuit for injecting the calibration signal.

29. The method of claim 25 further comprises separating the calibration signal from the receiver signal by a difference in frequency with a frequency domain multiplexing means that is operatively associated with the processor.

30. The method of claim 29 wherein the frequency difference of the frequency domain multiplexing means is selected as follows:

$$\Delta F = N/t_a$$

Wherein $\Delta F$ is the frequency difference;
N is an integer;
$t_a$ is the acquisition time interval.

31. The method of claim 30 wherein the frequency domain multiplexing means cancels out the receiver signal while processing the calibration signal, and cancels out the calibration signal while processing the receiver signal.

32. A device for obtaining a resistivity measurement of a subterranean geologic formation, said subterranean formation being intersected by a borehole, the device comprising:
means for generating a transmitting signal source and a calibration signal source;
a transmitter, located on said device, for transmitting the electromagnetic signal source;
a first receiver and a second receiver located on said device, for receiving the transmitted signal;
a first calibration signal injection circuit for injecting a calibration signal into said first receiver;
a second calibration signal injection circuit for injecting the calibration signal into said second receiver;
a first data acquisition electronics circuit for digitizing the uncalibrated and calibration signals from the first receiver;
a second data acquisition electronics circuit for digitizing the uncalibrated and calibration signals from the second receiver;
an acquisition processor for receiving the digitized data from the first and second data acquisition electronics and obtaining the resistivity measurement, and wherein the step of processing the receiver signal and the calibration signal includes calculating a phase difference free of data acquiring errors by computing the phase difference as follows:

$$PD = (\theta_{M1} - \theta_{M2}) - (\theta_{MC1} - \theta_{MC2})$$

Wherein PD is the phase difference free from acquisition errors;
$\theta_{M1}$ is the measured phase of the uncalibrated receiver signal from the first receiver;
$\theta_{M2}$ is the measured phase of the uncalibrated receiver signal from the second receiver;
$\theta_{MC1}$ is the measured phase of the calibration signal from the first receiver; and,
$\theta_{MC2}$ is the measured phase of the calibration signal from the second receiver.

33. The device of claim 32 wherein the injected calibration signal is added in series with the first receiver and the second receiver.

34. The device of claim 32 wherein the injected calibration signal is injected into the first receiver and the second receiver front ends using a current loop.

35. The device of claim 34 wherein the current loop has a current transformer placed therein and the device further includes means for sampling the current in the loop with the current sampling resistor.

* * * * *